(12) United States Patent
Demaratos

(10) Patent No.: US 11,848,514 B2
(45) Date of Patent: Dec. 19, 2023

(54) ELASTOMER SEAL SPRING

(71) Applicant: J.S.T. CORPORATION, Farmington Hills, MI (US)

(72) Inventor: David Demaratos, Wixom, MI (US)

(73) Assignee: J.S.T. CORPORATION, Farmington Hills, MI (US)

(*) Notice: Subject to any disclaimer, the term of this patent is extended or adjusted under 35 U.S.C. 154(b) by 0 days.

(21) Appl. No.: 18/095,942

(22) Filed: Jan. 11, 2023

(65) Prior Publication Data

US 2023/0170643 A1 Jun. 1, 2023

Related U.S. Application Data

(62) Division of application No. 17/375,995, filed on Jul. 14, 2021.

(Continued)

(51) Int. Cl.
*F16J 15/02* (2006.01)
*H01R 13/52* (2006.01)
(Continued)

(52) U.S. Cl.
CPC ........ *H01R 13/5202* (2013.01); *F16J 15/024* (2013.01); *F16J 15/025* (2013.01);
(Continued)

(58) Field of Classification Search
CPC ............ H01R 13/5202; H01R 13/5219; H01R 13/506; H01R 13/5208; H01R 13/5216;
(Continued)

(56) References Cited

U.S. PATENT DOCUMENTS 2,700,141 A  1/1955 Jones
3,448,430 A * 6/1969 Kelly ........................ H01R 9/05
439/607.52

(Continued)

FOREIGN PATENT DOCUMENTS

CN   108987989 A  * 12/2018 ........... H01R 13/502
CN   109273931 A  *  1/2019 ........... H01R 13/504

(Continued)

OTHER PUBLICATIONS

International Search Report for International Application No. PCT/US2022/022391 dated Aug. 19, 2022 (4 sheets).

(Continued)

*Primary Examiner* — Tho D Ta
(74) *Attorney, Agent, or Firm* — Kratz, Quintos & Hanson, LLP

(57) ABSTRACT

The seal spring of the present invention has a dual functionality. The seal spring provides both a sealing property and spring function in use within an electrical connector system, which is accomplished by its elastomeric qualities. The seal spring is preferably comprised of Silicone, EPDM rubber or materials and compositions that provide similar performance during use, or the like. The seal spring of the present invention is not limited or defined into a spring section or a seal section by its geometry. Shown is an implementation of the seal spring within a conductive female housing and connector assembly. The seal spring compresses and provides adequate spring force against a disk ferrule assembly, pressing the disk ferrule assembly, with a wire shield, against a conductive female outer housing, providing a grounding scheme for the connector assembly. The seal spring also seals against the female outer housing and a wire.

7 Claims, 6 Drawing Sheets

Related U.S. Application Data

(60) Provisional application No. 63/169,511, filed on Apr. 1, 2021, provisional application No. 63/051,517, filed on Jul. 14, 2020.

(51) Int. Cl.
| | |
|---|---|
| *H01R 13/506* | (2006.01) |
| *H01R 13/652* | (2006.01) |
| *H01R 13/6581* | (2011.01) |
| *H01R 43/00* | (2006.01) |
| *H01R 43/18* | (2006.01) |

(52) U.S. Cl.
CPC ........ *F16J 15/028* (2013.01); *H01R 13/5219* (2013.01); *H01R 13/506* (2013.01); *H01R 13/5208* (2013.01); *H01R 13/5216* (2013.01); *H01R 13/652* (2013.01); *H01R 13/6581* (2013.01); *H01R 43/005* (2013.01); *H01R 43/18* (2013.01)

(58) Field of Classification Search
CPC ...... H01R 43/005; F16J 15/024; F16J 15/025; F16J 15/028
See application file for complete search history.

(56) References Cited

U.S. PATENT DOCUMENTS

| | | | | |
|---|---|---|---|---|
| 3,603,912 | A * | 9/1971 | Kelly | H02G 3/0616 |
| | | | | 285/341 |
| 3,678,441 | A | 7/1972 | Upstone | |
| 4,195,893 | A | 4/1980 | Stupay | |
| 4,588,242 | A | 5/1986 | Mcdowell | |
| 5,782,657 | A | 7/1998 | Wolla | |
| 5,911,599 | A * | 6/1999 | Masuda | H01R 13/6592 |
| | | | | 439/578 |
| 6,015,304 | A | 1/2000 | Yagi | |
| 6,234,847 | B1 | 5/2001 | Chang | |
| 6,554,623 | B2 * | 4/2003 | Yoshioka | H01R 13/6592 |
| | | | | 439/98 |
| 6,702,611 | B1 * | 3/2004 | Miyazaki | H01R 13/6593 |
| | | | | 439/564 |
| 7,976,340 | B1 | 7/2011 | Saraswat | |
| 9,997,884 | B1 * | 6/2018 | Matsumoto | H01R 43/0263 |
| 10,116,078 | B1 | 10/2018 | Durse et al. | |
| 10,559,919 | B2 * | 2/2020 | Masuda | H01R 13/193 |
| 10,574,001 | B2 * | 2/2020 | Data | H01R 13/53 |
| 2001/0053624 | A1 | 12/2001 | Medina | |
| 2002/0142636 | A1 | 10/2002 | Murr | |
| 2003/0008555 | A1 * | 1/2003 | Obata | H01R 13/6582 |
| | | | | 439/578 |
| 2004/0147146 | A1 | 7/2004 | Vermeersch | |
| 2006/0134982 | A1 | 6/2006 | Zarganis | |
| 2007/0059970 | A1 | 3/2007 | Ichio | |
| 2008/0057758 | A1 | 3/2008 | Walter | |
| 2008/0119088 | A1 * | 5/2008 | Noh | H01R 9/0518 |
| | | | | 439/607.41 |
| 2008/0299826 | A1 | 12/2008 | Cheng | |
| 2008/0318473 | A1 | 12/2008 | Morikawa | |
| 2010/0003852 | A1 | 1/2010 | Myer | |
| 2010/0160991 | A1 | 6/2010 | Lim | |
| 2011/0280653 | A1 | 11/2011 | Sjostedt | |
| 2012/0021645 | A1 * | 1/2012 | Marsh | H01R 11/12 |
| | | | | 439/578 |
| 2013/0072063 | A1 | 3/2013 | Qiao | |
| 2014/0106597 | A1 | 4/2014 | Gimbel et al. | |
| 2017/0018874 | A1 | 1/2017 | Kida | |
| 2018/0076561 | A1 | 3/2018 | Aoshima | |

FOREIGN PATENT DOCUMENTS

| | | | | |
|---|---|---|---|---|
| CN | 110998983 | A * | 4/2020 | ........... H01R 13/052 |
| DE | 19727453 | A1 * | 1/1999 | ........... H01R 13/506 |
| KR | 20180020366 | A * | 2/2018 | |

OTHER PUBLICATIONS

International Search Report for International Application No. PCT/US2022/022605 dated Aug. 19, 2022 (4 sheets).
International Search Report for International Application No. PCT/US2022/022912 dated Jul. 8, 2022 (2 sheets).
International Search Report for International Application No. PCT/US2021/051998 dated Jan. 14, 2022 (2 sheets).

* cited by examiner

ELASTOMER SEAL SPRING

CROSS-REFERENCE TO RELATED APPLICATIONS

This patent application claims priority to 63/169,511 Apr. 1, 2021 and U.S. Provisional Patent Application No. 63/051,517 filed Jul. 14, 2020, which is hereby incorporated herein by reference in its entirety.

BACKGROUND OF THE INVENTION

Field of the Invention

Silicone or any elastomer material (material that is rubber like in nature) is often used in applications, specifically in electrical connector systems, as a material which will form a seal for the purpose of preventing outside elements, such as but not limited to, water, air (any gaseous element or molecule), or any debris defined as any foreign material not present when the connector system is assembled, from entering into the connector system. The sealing property of a specific seal is accomplished by the elastomeric property of the material and the proper geometric shape or shapes for operating within its location in the connector system. These seals are often named based on their intended location of use, with terms such as face seal, interface seal, ring seal, cable seal, mat (or matte) seal, and wire seal.

Description of the Related Art

EXAMPLE 1

The use of a silicone (elastomer) seal in a connector application may include a mat (or matte) seal. The mat (matte) seal may be used in a header or device configuration connector assembly where it functions in a singular function as a seal. The mat (matte) seal are performing a singular function (sealing), sealing against two independent (separate) surfaces. And a back cover typical of designs using a mat (matte) seal, will secure and protect the mat (matte) seal.

EXAMPLE 2

The use of a silicone (elastomer) seal in a connector application may include two mat (matte) seals. The two mat (matte) seals may be used within a wire to wire (inline) configuration connector assembly. One mat (matte) seal being a female mat (matte) seal, the other is a male mat (matte) seal. Both of the mat (matte) seals are sealing, for example, a location between the seal and a plastic housing, as well as, sealing between the seal and wires that travel through an inner cavity of the mat seal. Note, the mat (matte) seals are performing a singular function (sealing) but are sealing against two independent (separate) surfaces, respectively. And a back cover is included for each seal which is typical of designs using a mat (matte) seal, to secure and protect the mat (matte) seal.

EXAMPLE 3

The use of a silicone (elastomer) seal in a connector application may include an overmolded mat seal and a face seal. The overmolded mat seal and the face seal may, be used within a cast device with face seal configuration connector assembly. The overmolded mat (matte) seal is sealing, for example, a location between the seal and a plastic housing, as well as, sealing between the seal and a wire that travels through the inner cavity of the overmolded mat (matte) seal. The face seal is one continuous seal which is sealing between the plastic housing and the cast device. The seal is operating not unlike a gasket or O-ring.

Note, the mat (matte) seal and the face seal are performing a singular function (sealing) wherein, the mat (matte) seal is sealing against two independent (separate) surfaces, respectively and the overmolded mat (matte) seal is sealing against a single surface. And a back cover is included, which is again typical of designs using a mat (matte) seal, to secure and protect the mat (matte) seal.

SUMMARY OF THE INVENTION

The seal spring of the present invention has a dual functionality. In use, the seal spring provides both a sealing property and spring function within an electrical connector assembly. The dual functionality is accomplished by its elastomeric qualities. The seal spring is comprised of Silicone, EPDM rubber, materials and compositions which provide similar performance during use, or the like. Additionally, the seal spring of the present invention is also not limited or defined into a spring section or a seal section by its geometry. Thus, the seal spring is not geometry based and it may function anywhere the dual functionality of a seal function and spring function is required. One such implementation is within an inner cavity of a housing of a connector assembly, which is described in detail in the present application.

A connector assembly having the seal spring of the present invention will also preferably contain a disk ferrule assembly. The seal spring will interact with the disk ferrule assembly. In use, the seal spring will be compressed and deformed, pressing against the disk ferrule assembly on one end and a housing back cover on the other end. The seal spring will therefore provide a spring function. Additionally, the disk ferrule assembly provides a grounding device for the connector assembly via a wire shield attached to the disk ferrule assembly. For the disk ferrule assembly to assist with the grounding of the connector assembly, it is required for the disk ferrule assembly to, for example, contact a grounding scheme, In the present application the grounding scheme includes a conductive housing (made of metallic infused resin) but may also be a conductive element (ie. traditional stamped shield or similar grounding device) within the housing, but the grounding device is not limited thereto these aforementioned examples.

Here, in use, the seal spring of the present invention is being compressed and deformed into an inner cavity of a female outer housing. The seal spring is compressed into the inner cavity when a housing back cover is mated and secured with the female outer housing. The elastomeric properties and durometer specification of the seal spring allows the compressed state of the seal spring to exert a spring force against both the housing back cover and, more importantly, the disk ferrule assembly. The seal spring generates and exerts an outward spring force which acts to push the seal spring against the disk ferrule assembly, securing the disk ferrule assembly to an inner wall of the female outer housing (conductive housing) or to a grounding device (ie. traditional stamped shield) within the female outer housing (not shown).

Additionally, the sealing properties of the seal spring allow the compressed seal spring to maintain and provide an outer sealing function against the female outer housing 210 and inner sealing function against the wire 300.

The seal spring, as is shown, may also have a protrusion assisting in the contact of the seal spring with the disk ferrule assembly and/or housing back cover without disturbing the deformation or sealing geometry of the seal spring in use and operation.

DETAILED DESCRIPTION OF THE PREFERRED EMBODIMENTS

Figure 1:
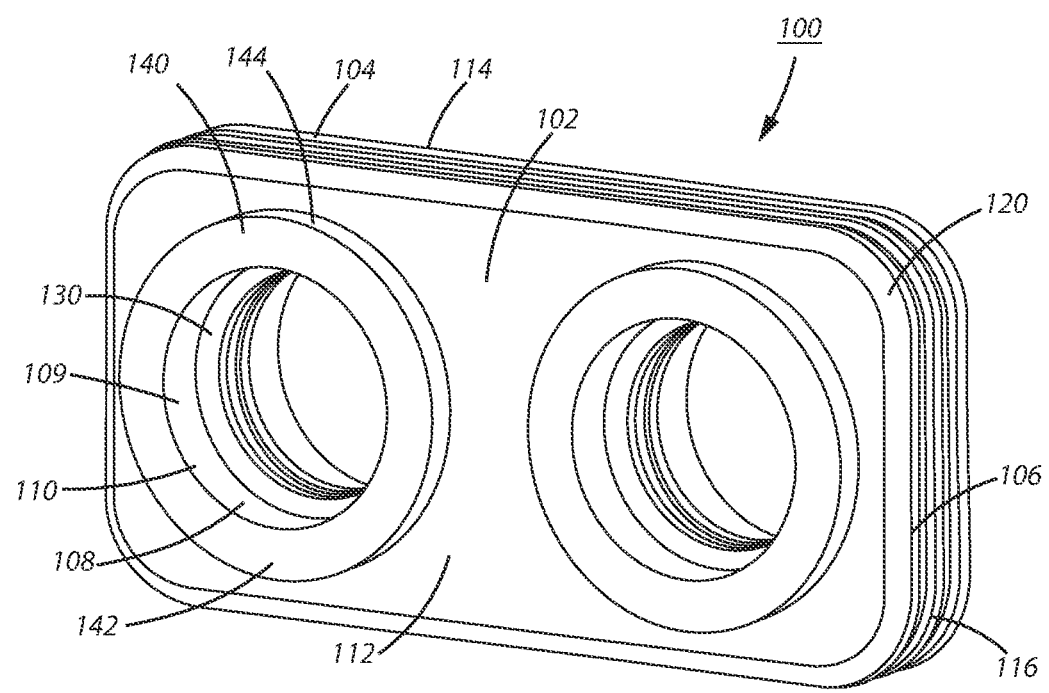
FIG. 1 is a front perspective view of the seal spring of the present invention.
Figure 2:
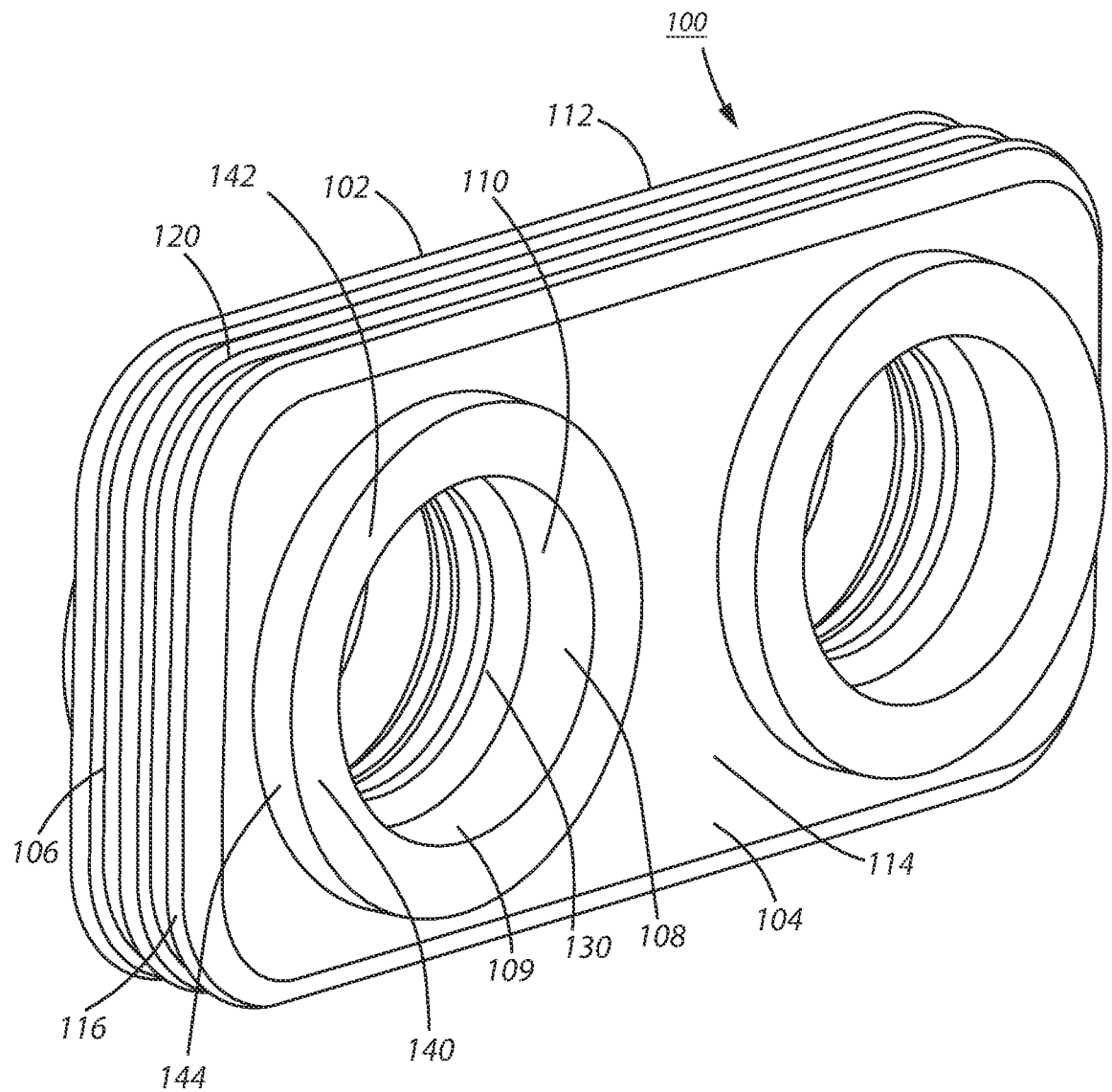
FIG. 2 is a rear perspective view of the seal spring of the present invention.

As seen in FIG. 1 is the preferred embodiment of the seal spring 100 of the present invention. The seal spring 100 is preferably comprised of silicone, EPDM rubber or materials and compositions that provide similar performance during use, or the like. The seal spring 100 has a first face 102, a first face surface 112, a second face 104, a second face surface 114 and a side 106. The side 106 having a surface 116 and the side 106 being between the first face 102 and second face 104. The seal spring 100 also has an outer sealing portion 120 which is on a portion of the side 106 and is formed by a portion of the side surface 116. Here, the outer sealing portion 120 is preferably substantially centrally located on the side 106 (See FIG. 1, 2), Further, the seal spring 100 has an inner aperture 108, having a side wall 109. The side wall 109 having a surface 110. A quantity of two inner aperture 108 are shown in FIGS. 1 and 2, the quantity of inner aperture 108 is preferably one or greater than one. Additionally, the seal spring 100 has an inner sealing portion 130 located inside the inner aperture 108 on a portion of its respective side wall 109 and formed by a portion of the side surface 110. Here, the inner sealing portion 130 is preferably substantially centrally located on the side wall 109.

The seal spring 100, as shown, also has a protrusion 140 which surrounds and corresponds with the inner aperture 108. As shown in FIG. 1 and FIG. 2, the protrusion 140 protrudes from both the first face 102 and the second face 104 respectively. Alternatively, another embodiment may have the protrusion 140 protruding from either the first face 102 or the second face 104 (not shown). The protrusion 140 has a side surface 144 and a vertical surface 142. The side surface 144 is substantially perpendicular to the respective first face 102, or second face 104, from which it extends. The vertical surface 142 is substantially parallel to the respective first face 102, or second face 104, from which it extends. Additionally, the side surface 144 and the vertical surface 142 meet at and extend substantially perpendicular to one another.

The seal spring 100, as shown, has two of the inner aperture 108, with a corresponding pair of protrusions 140, one extending from the first face 102 and one extending from the second face 104 (see, FIGS. 1-2, 5-6). As previously mentioned, the quantity of inner aperture 108 is preferably one or greater than one and is not limited hereto. Likewise, the quantity of protrusion 140 corresponding to a quantity of inner aperture 108 is preferably one or two, and more preferably the quantity of the protrusion 140 is two per quantity of inner aperture 108, a pair, wherein one of the two protrusions 140 extends from the first face 102 and the other one of the two protrusions 140 extends from the second face 104 (see, FIGS. 1-2, 5-6).

FIG. 2 illustrates the second face 104 and second face surface 114 of seal spring 100. The side 106 having a side surface 116 is also illustrated. As previously mentioned, the seal spring 100 has an outer sealing portion 120 and an inner sealing portion 130. The outer sealing portion 120 interacts and seals with a female outer housing 210 of connector assembly 200 as (see, FIG. 6). The inner sealing portion 130 interacts and seals with an inner insulation 302 of a wire 300 as will be discussed in more detail later (see, FIG. 6).

Figure 3:
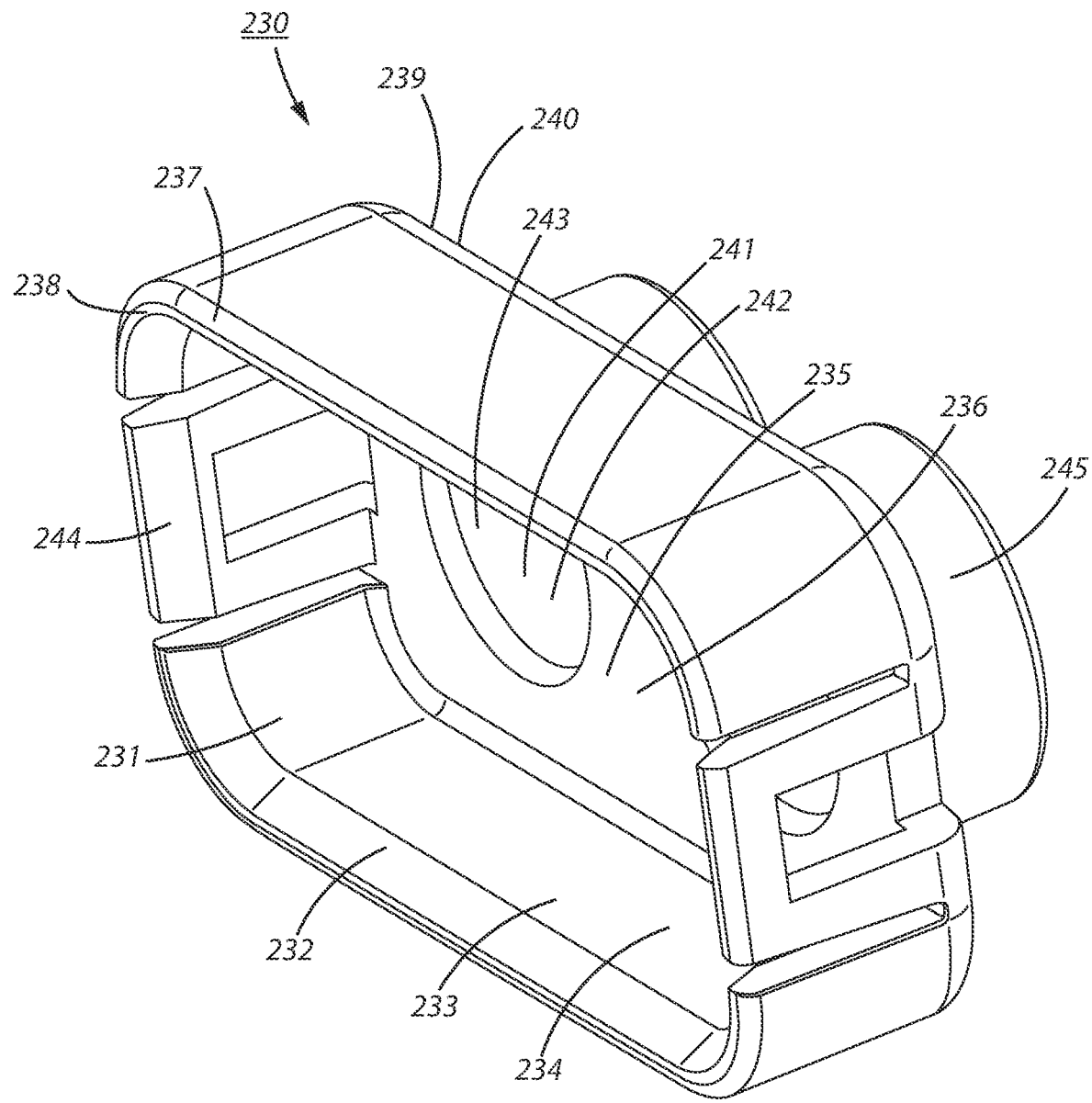
FIG. 3 is an end perspective view of the housing back cover of the present invention.

Shown in FIG. 3 is the housing back cover 230 of the connector assembly 200. The housing back cover 230 has an inner cavity 231. The inner cavity 231 has a side wall 233. The side wall 233 has a surface 234. Additionally, the inner cavity 231 of the housing back cover 230 has an opening 232 within a first end portion 237 and surface of the first end portion 238. Further, the housing back cover 230 has a second end portion 239. The end portion 239 has an outer surface 240. The inner cavity 231 additionally has a rear wall 235, the rear wall 235 is part of the second end portion 239. The rear wall 235 has an inner surface 236. Additionally, extending substantially perpendicular from the second end portion 239 is a wire collar strain relief 245 of the housing back cover 230. The housing back cover 230 has an aperture 241 extending through the rear wall 235 of the second end portion 239. The aperture 241 further extends and is within the wire collar strain relief 245. The aperture 241 has a side wall 242. The side wall 242 has a surface 243. The aperture 241 corresponds and centrally aligns to each of an inner aperture 108 provided in the seal spring 100 respectively.

Figure 4:
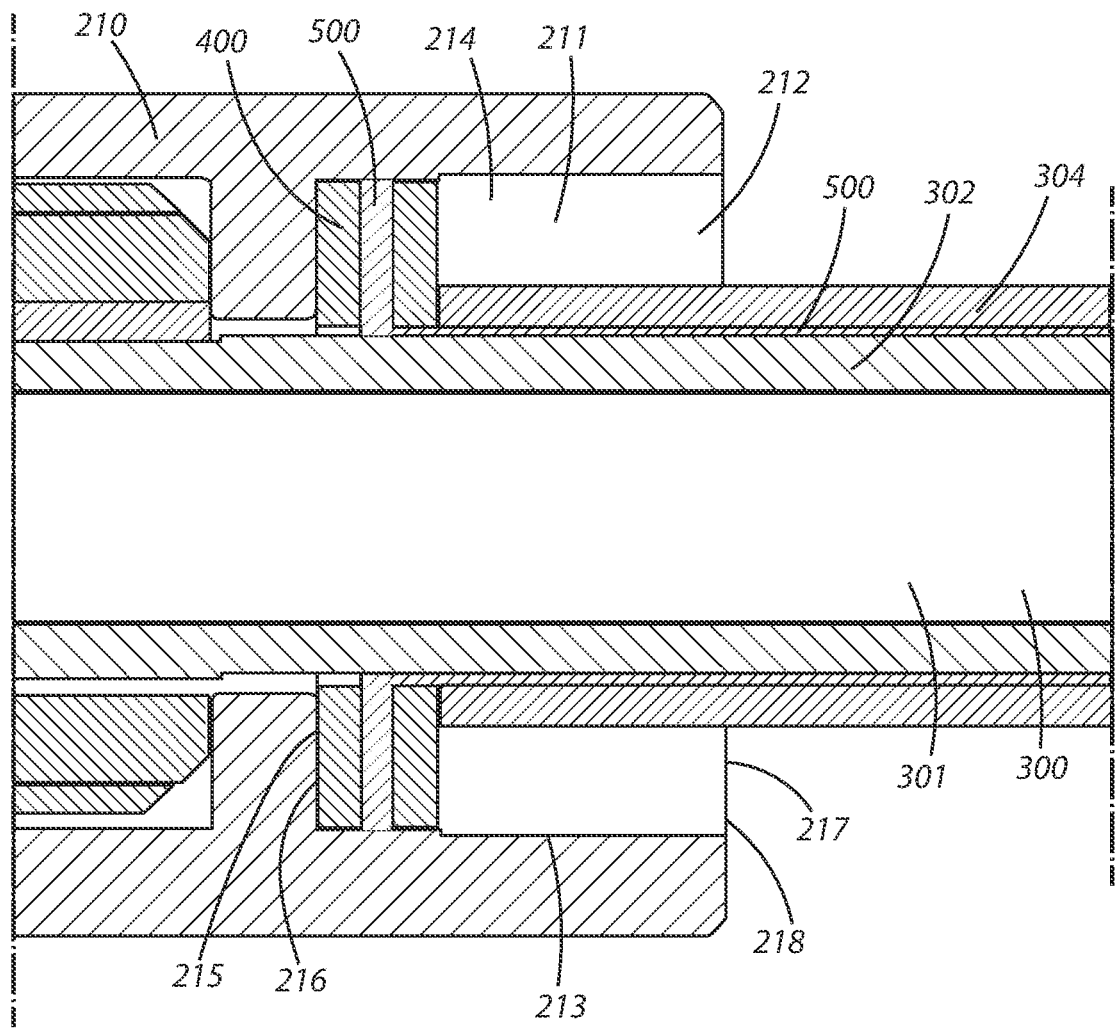
FIG. 4 is a cross section view of the female housing with a wire inserted with a disk ferrule assembly installed.

In FIG. 4 is an illustration of the female outer housing 210 containing the wire 300. The female outer housing 210 has an inner cavity 211. The inner cavity 211 has a side wall 213. The side wall 213 has a surface 214. Additionally, the inner cavity 211 of the female outer housing 210 has an opening 212 at an end portion 217. The end portion 217 has a surface 218. The inner cavity 211 additionally has a rear wall 215. The rear wall 215 has a surface 216.

Also detailed in FIG. 4 is the wire 300. The wire 300 has a wire core 301, an inner insulation 302, a wire outer insulation 304 and a wire shield 500. The wire 300 has an axial direction A (as labeled in FIG. 6). The wire shield 500 is located between the inner insulation 302 and the outer insulation 304 of the wire 300. The wire core 301 is located within the inner insulation 302.

Further, in FIG. 4, the wire 300 is inserted into the female outer housing 210. One end of the wire core 301 is fixed and connected to a terminal (not shown). The terminal is locked within the female outer housing 201. Therefore the wire core 301 is secured and fixed from moving once the terminal is locked within the female outer housing 201, and the wire 300 is thus also locked in place, and its forward motion is inhibited and limited.

Also seen in FIG. 4 is the disk ferrule assembly 400 which is positioned over the inner insulation 302 of the wire 300 and inside the inner cavity 211 of the female outer housing 210. In FIG. 4, a portion of the outer insulation 304 has been removed whereby the disk ferrule assembly 400 is located adjacent to a free end portion of the outer insulation 304. The wire shield 500 will be either within the disk ferrule assembly 400 or located on one side or the other, and fixed or secured to the disk ferrule assembly 400. Thus the portion of the wire shield 500 in contact or secured with the disk ferrule assembly 400 will accordingly move with, and be positioned with, the disk ferrule assembly 400.

Figure 5:
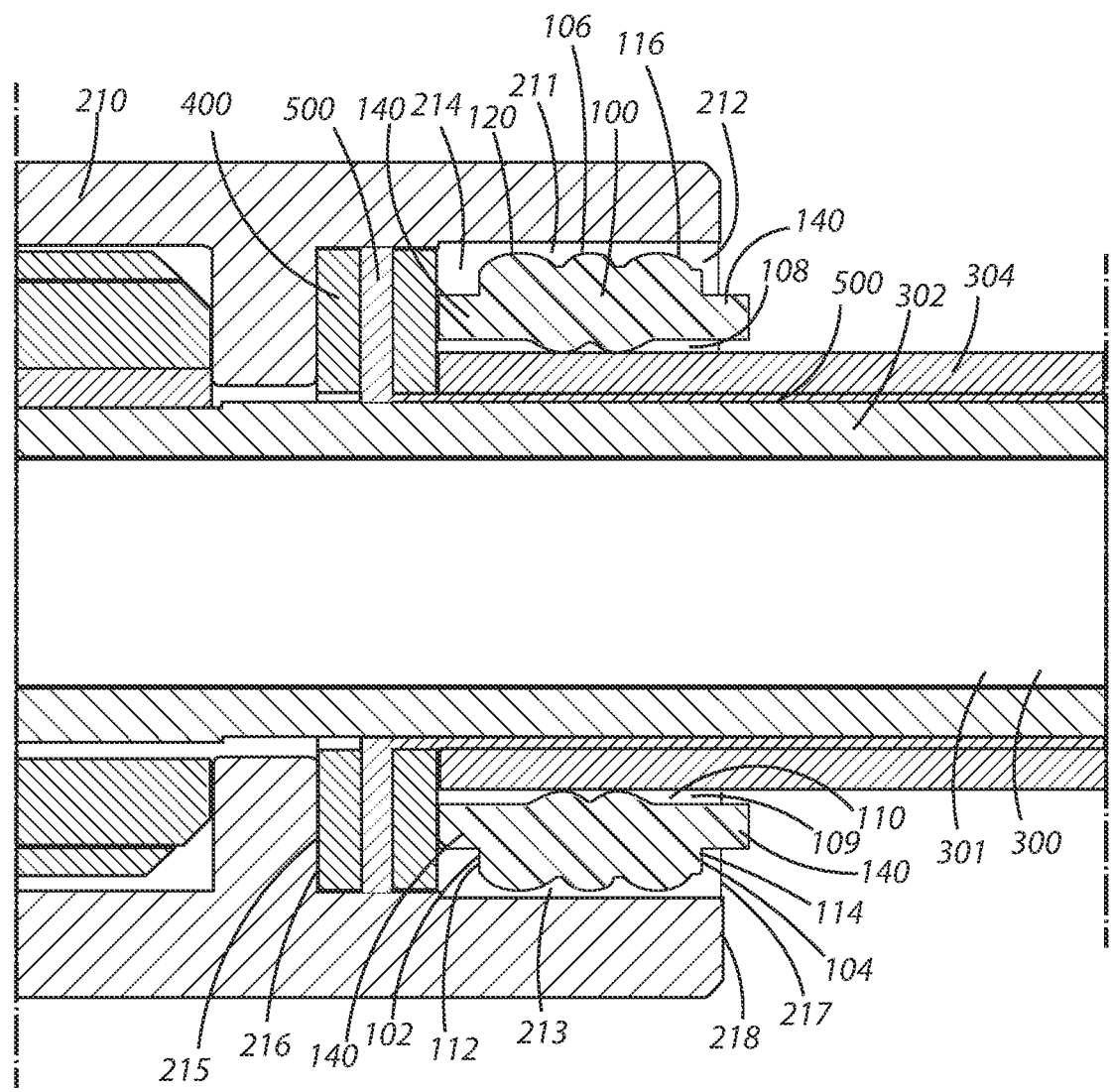
FIG. 5 is a cross section view of the female housing with a wire inserted, the disk ferrule assembly installed, and the seal spring residing in the female housing.

As shown in FIG. 5, the seal spring 100 is inserted into the female outer housing 301. The inner insulation 302 of the wire 300 is inserted and extends through the inner aperture 108 of the seal spring 100. The seal spring 100 is then inserted into the opening 212 of the inner cavity 211 of the female outer housing 210 while the seal spring 100 is moved along the axial direction A of the wire 300 and is further inserted towards and contacts the disk ferrule assembly 400. The seal spring 100 is limited by its movement further into the female outer housing 210 when the first face surface 112 of the first face 102 reaches and abuts the disk ferrule assembly 400. As seen in FIG. 5, the second face 104 and second face surface 114 of seal spring 100 protrudes from and extends outside of the inner cavity 211 of the female outer housing and within and past the opening 212 of the female outer housing 210.

Figure 6:
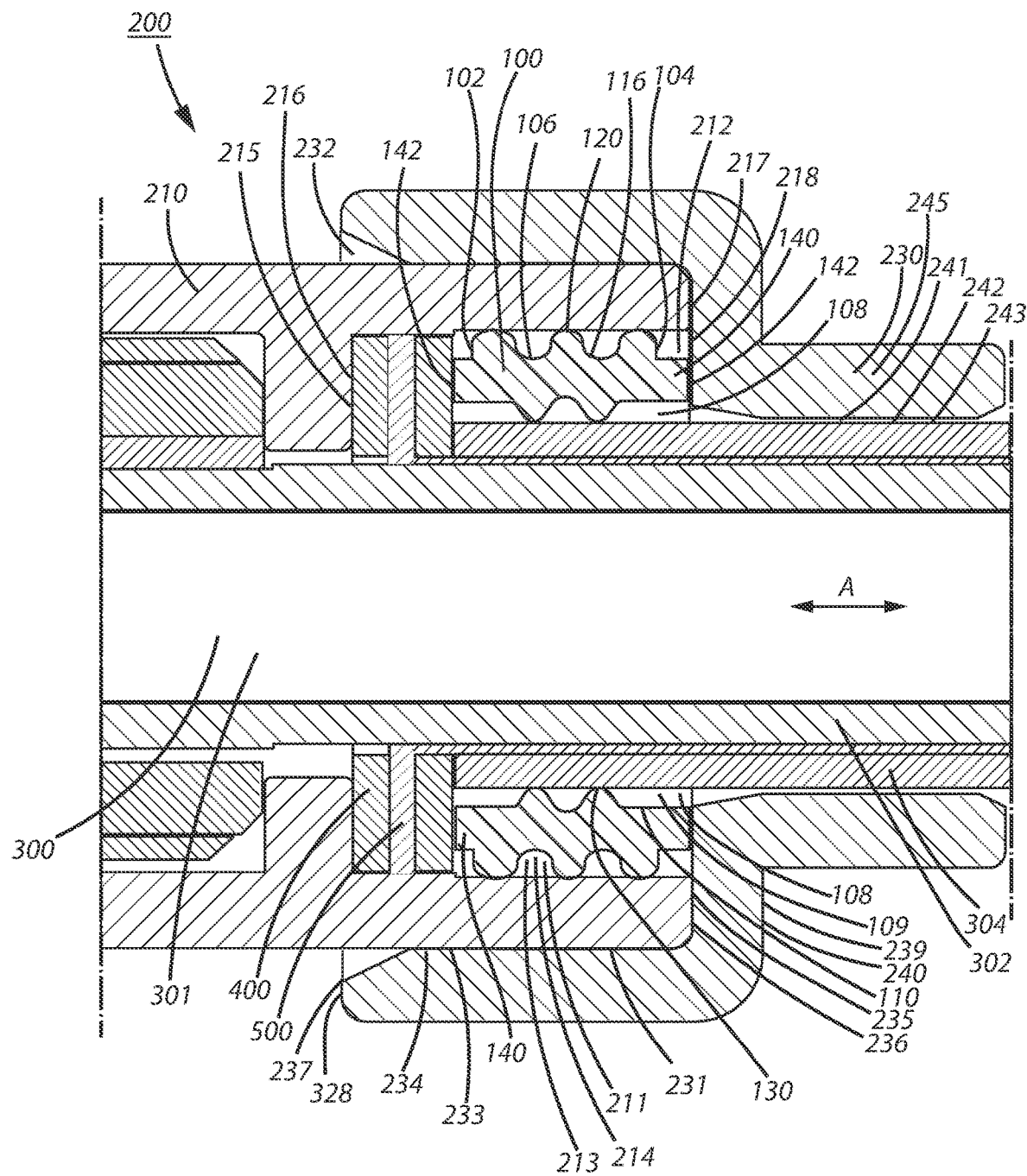
FIG. 6 is a cross section view of the assembled housing assembly having the female housing with a wire inserted, the disk ferrule assembly installed, the seal spring residing in the female housing, and with the housing back cover installed.

As shown in FIG. 6, the housing back cover 230 may interact with and be secured onto the female outer housing 210. The housing back cover 230 has retention tabs 244 for interacting with protrusions (not shown) on the exterior of the female outer housing 210. The retention tabs 244 allow the housing back cover 230 to be aligned, positioned, locked and secured to the exterior of the female outer housing 210. A portion of the female outer housing 210 will reside fully within the inner cavity 231 of the housing back cover 230. The female outer housing 210 will contact the surface 234 of the side wall 233 of the inner cavity 231 of the housing back cover 230. During mating, the female outer housing 210 will enter and pass through the opening 232 of the housing back cover 230. When the female outer housing 210 is fully mated and inserted into the inner cavity 231 of the housing hack cover, the end portion 217 and end portion surface 218 of the female outer housing 210 contacts and abuts the rear wall 235 of the inner cavity 231 of the housing back cover 230, on the inner surface 236 of the rear wall 235 of the inner cavity 231 of the housing back cover 230. This will limit the forward motion of the female outer housing 210 into the housing back cover 230, and preferably locates the female outer housing 210 within the housing back cover 230 for operation and use of the connector assembly 200.

Further, the housing back cover 230 also interacts with the seal spring 100. During the mating of the housing back cover 230 and female outer housing 210, the housing back cover 230 pushes against and abuts against the protrusion 140 of the seal spring 100. The protrusion 140 is protruding from the second face 104 of the seal spring. The inner wall of the housing back cover 230 abuts the vertical surface 142 of protrusion 140 extending from the second face 104 of the seal spring 100. Likewise, the vertical surface 142 of protrusion 140 extending from the first face 102 of the seal spring 100 is in full contact with the disk ferrule assembly 400. As the housing back cover 230 and the female outer housing 210 mate, the seal spring 100 is compressed in the axial direction A of the wire 300. Once the housing back cover 230 is secured and locked to the female outer housing 210 with retention tabs 244 locking to the exterior of the female outer housing 210, the seal spring 100 is fully compressed and fully resides within the inner cavity 211 of the female outer housing 210.

As in FIG. 6, the fully compressed and deformed, orientation or state of the seal spring 100, provides a spring-like force and spring function in two opposite directions along the axial direction A of the wire 300. First, towards the disk ferrule assembly 400 and second, towards the housing back cover 230. The spring-like force exerted towards the disk ferrule assembly 400 by the seal spring 100 provides a securing force for the disk ferrule assembly 400 which keeps or retains the disk ferrule assembly 400 in a state and position where the disk ferrule assembly 400 is abutting and fully contacting against the rear wall 215 of the inner cavity 211 of the female outer housing 210 (conductive), or to a stamped shield (not shown), or a similar grounding device within the inner cavity 211 of the female outer housing 210. The female outer housing 210 here has metallic properties (metal infused resin or metallic composition) wherein the female outer housing 210 is a conductive element which completes a grounding path or scheme for the connector assembly 200 by grounding the wire shield 500 provided to the disk ferrule assembly 400.

Additionally, in FIG. 6, while providing adequate spring force, the compressed seal spring 100 will maintain and provide an outer sealing function against the female outer housing 210 and inner sealing function against the wire 300. The outer sealing portion 120 of the seal spring 100 will seal against the surface 214 of the side wall 213 of the inner cavity 211 of the female outer housing 210 (see, FIG. 6). The inner sealing portion 130 of the seal spring 100 will seal against the inner insulation 302 of the wire 300 (see, FIG. 6). Thus, the seal spring 100 is sealing against two independent, separate surfaces.

The elastic properties and durability of the seal spring 100 material is optimized such that the aforementioned combination of properties and effects is provided. Additionally, the seal spring 100 of the present invention is not limited or defined into a spring section or a seal section by its geometry. Thus, the seal spring 100 is not geometry based and it may function anywhere the dual functionality of a seal function and spring function is required. Further, the size or space of the inner cavity 211 of the female outer housing 210, may be optimized and adjusted to allow for deformation of the seal spring 100 in order to migrate and not interrupt the spring function or the inner and outer sealing properties of the seal spring 100. Alternatively, the size of the protrusion 140 of the seal spring 100 may be optimized and adjusted to allow for deformation of the seal spring 100 in order to migrate and not interrupt the spring function or the inner and outer sealing properties of the seal spring 100.

Although the foregoing descriptions are directed to preferred embodiments in the manufacturing method for assembling at least the vertical disk ferrule of this invention, it is noted that other variations and modifications will be apparent to those skilled in the art, and may be made without departing from the spirit or scope of the invention. Moreover, the manufacturing method for assembling at least the vertical disk ferrule of this invention in connection with one embodiment of the invention may be used in conjunction with other embodiments, even if not explicitly state above.

I Claim:

1. A method for assembling a seal spring in a connector assembly, comprising the steps of:
   inserting said seal spring over a wire;
   inserting said seal spring into an inner cavity of a housing;
   pushing said housing into a housing back cover;
   thereafter, pushing said housing into said housing back cover so as to provide a lock position for a retention tab on a protrusion located on said housing;

compressing seal spring within said housing;

pressing seal spring against a disk ferrule assembly; and thereafter, providing a spring force to said seal spring, wherein the wire is accommodated by an inner aperture of said seal spring, and a face of said seal spring has a protrusion surrounding and corresponding with said inner aperture, and wherein said protrusion of said seal spring extends from said face of said seal spring and is in contact with said housing back cover, wherein a second face of said seal spring has a second protrusion extending from said second face of said seal spring, said second face of said seal spring being opposite to said face of said seal spring.

2. The method according to claim 1, wherein said step of pressing seal spring against said disk ferrule assembly, presses said disk ferrule assembly against said housing after said step of providing a spring force to said seal spring.

3. The method according to claim 1, wherein said method for assembling a seal spring in said connector assembly, said seal spring presses against said housing back cover after said step of providing a spring force to said seal spring.

4. The method according to claim 1, wherein said method for assembling a seal spring in said connector assembly, includes providing said housing with a grounding device.

5. A method according to claim 1, wherein said seal spring seals against said inner cavity of said housing.

6. A method according to claim 1, wherein said seal spring seals against said wire.

7. A method according to claim 1, wherein a second face of said seal spring has said second protrusion surrounding and corresponding with said inner aperture, said second protrusion of said seal spring being in contact with said disk ferrule assembly.

* * * * *